United States Patent [19]

Nakamura

[11] Patent Number: 5,943,617
[45] Date of Patent: Aug. 24, 1999

[54] RADIO CHANNEL TEST SYSTEM FOR MOBILE TELECOMMUNICATION SYSTEM WITH TEST TERMINALS IN RADIO SERVICE ZONES OF RADIO BASE STATIONS

[75] Inventor: Tsutomu Nakamura, Tokyo, Japan

[73] Assignee: NEC Corporation, Tokyo, Japan

[21] Appl. No.: 08/893,559

[22] Filed: Jul. 11, 1997

[30] Foreign Application Priority Data

Jul. 11, 1996 [JP] Japan ................................ 8-182055

[51] Int. Cl.⁶ .............................. H04B 1/06; H04B 17/00
[52] U.S. Cl. ...................... 455/423; 455/424; 455/67.4; 455/67.1; 375/225; 375/226; 375/227
[58] Field of Search .................................. 455/32.1, 434, 455/161.3, 438, 443, 436, 561, 560, 69, 423, 424, 425, 67.1, 67.4; 375/225, 226, 227, 377, 205

[56] References Cited

U.S. PATENT DOCUMENTS

| | | | |
|---|---|---|---|
| 5,361,402 | 11/1994 | Grube et al. ........................... | 455/67.1 |
| 5,475,868 | 12/1995 | Duque-Anton et al. ................. | 455/62 |
| 5,768,689 | 6/1998 | Borg ...................................... | 455/67.4 |
| 5,802,105 | 9/1998 | Tiedemann, Jr. et al. .............. | 375/225 |
| 5,802,446 | 9/1998 | Giorgi et al. .......................... | 455/69 |

FOREIGN PATENT DOCUMENTS

| | | |
|---|---|---|
| 1-162952 | 11/1989 | Japan . |
| 5-75516 | 3/1993 | Japan . |
| 7-508382 | 9/1995 | Japan . |

*Primary Examiner*—Wellington Chin
*Assistant Examiner*—Sheila Smith
*Attorney, Agent, or Firm*—Foley & Lardner

[57] ABSTRACT

In a mobile telecommunication system, a test terminal is disposed in each of radio service zones of a plurality of radio base stations connected to a mobile switching station, and a testing device is connected to the mobile switching station and calling the test terminal to send out a first test pattern through a down link. The test terminal receives the first test pattern and compares the received first test pattern with a second test pattern equal to the first test pattern to send back the compared result as test data through an up link. The test terminal sends out the second test pattern to the testing device through an up link. The testing device defines the radio channel condition of the down link from the test data and the up link from comparison of the first test pattern with the received second test pattern, and sends out an instruction to the test terminal. The test terminal announces comments and displays images for indicating the radio channel condition in the radio service zone.

17 Claims, 4 Drawing Sheets

RADIO CHANNEL TEST SYSTEM FOR MOBILE TELECOMMUNICATION SYSTEM WITH TEST TERMINALS IN RADIO SERVICE ZONES OF RADIO BASE STATIONS

BACKGROUND OF THE INVENTION

This invention relates to a test system for a mobile telecommunication system and, in particular, to a test system for use in measuring conditions of radio channels within each of radio service zones of radio base stations in the mobile telecommunication system.

A mobile telecommunication system comprises a mobile switching station, a plurality of radio base stations coupled to the mobile switching station and having radio service zones, respectively, and a plurality of mobile terminals freely moving in the radio service zones. A particular one of the mobile terminals currently is in a particular one of the radio service zones and communicates with a particular one of the radio base stations having the particular radio service zone through radio channels in the particular radio service zone to thereby perform communication with the mobile switching station through an up link and a down link including the radio channels.

The condition of radio channels is variable and affects the radio communication quality between the mobile station and the radio base station. The worst condition or obstacle of the radio channels disables the communication between them.

In order to measure conditions of radio channels in the radio service zones, JP-A-59 196633 discloses a remote testing apparatus which is connected to the mobile switching center. The remote testing apparatus comprises a central processing unit, a printer, a memory, a display terminal, a signal generator and a level meter. While, each of the mobile terminals is provided with a first loop back switch and a second loop back switch between a transmitting circuit and receiving circuit in the mobile terminal.

In testing, the remote testing apparatus originates a test call to a particular one of the mobile terminals to establish a down link and an up link between the remote testing apparatus and the particular mobile terminal through the mobile switching center and a particular one of the base stations having a particular one of radio service zones in which the particular mobile terminal currently exists. The particular mobile terminal is responsive to the test call to establish a test loop by connecting the down link with the up link through the first and the second loop back switches. Then, the remote testing apparatus sends out a test signal to the particular mobile terminal. The test signal is transmitted through the test loop and comes back to the remote testing apparatus. Thus, the remote testing apparatus can measure the entire characteristic of the down link and the up link. Thus, it is possible to know conditions of the radio channels in the particular radio service zone.

However, the known remote testing apparatus cannot measure conditions of the up and down links independently from each other.

Further, in use of the known remote testing apparatus, each of the mobile terminals must be provided with the first and second loop back switches and a function for driving the loop back switches in response to the test call. This unfortunately makes the mobile terminal expensive.

Moreover, the current mobile telecommunication system has no broadcasting system. Therefore, it is impossible to give information of the radio channel condition to a plurality of mobile terminals in the particular radio service zone.

SUMMARY OF THE INVENTION

It is an object of this invention to provide a radio channel test system in a mobile telecommunication system which enables to measure conditions of an up link and a down link, respectively, in each of radio service zones of radio base stations.

It is another object is to realize the above object without necessity of any additional testing provisions to each of the mobile terminals.

It is another object to provide the radio channel test system which can notify the radio channel condition to users of mobile terminals.

This invention is applicable to a mobile telecommunication system comprising a mobile switching station, a plurality of radio base stations coupled to the mobile switching station and having radio service zones, respectively, and a plurality of mobile terminals freely moving in the radio service zones, a particular one of the mobile terminals currently being in a particular one of the radio service zones and communicating with a particular one of the radio base stations having the particular radio service zone through radio channels in the particular radio service zone to thereby perform communication with the mobile switching station through an up link and a down link including the radio channels. According to this invention, there is provided a radio channel test system for use in the mobile telecommunication system, which comprises a testing device connected to the mobile switching center and having a first test pattern, and a plurality of test terminals disposed within the radio service zones, respectively, and having a second test pattern equal to the first test pattern, the testing device calling a particular one of the plurality of test terminals to send out the first test pattern to the particular test terminal through the down link and to obtain test data from the particular test terminal through the up link, the particular test terminal receiving the first test pattern as a received pattern and comparing the received pattern with the second test pattern to produce a compared result, the particular test terminal sending out the compared result as the test data to the testing device through the up link.

Each of the test terminals has an indicator for indicating radio channel condition. The testing device sends out a condition indication instruction to the particular test terminal when defining the radio channel condition from the test data, and the particular test terminal is responsive to the condition indication instruction to drive the indicator to indicate the radio channel condition.

In the embodiment, the indicator comprises an announcing device for announcing comments indicating the radio channel condition, and/or a display for displaying an image indicating the radio channel condition.

In the radio channel test system in a mobile telecommunication system, for testing the up link, the particular test terminal sends out the second test pattern to the testing device through the up link, the testing device receiving the second test pattern as a reception pattern and comparing the reception pattern with the first test pattern to produce an error therebetween, the testing device sending out the condition indicating instruction to the particular test terminal when defining a radio channel obstacle of the up link from the error.

According to another aspect, the testing device sends out the first test pattern repeatedly to produce a plurality of subsequent received patterns at the test terminal, a prior one of the subsequent received patterns is used as the second test pattern and is compared with the next subsequent one of the subsequent received patterns to obtain the compared results.

According to this invention, there is further provided a radio channel test terminal for use in the radio channel testing system, which comprises a memory for storing test patterns including a second test pattern equal to the first test pattern, a receiver for receiving the first test pattern as a received first test pattern to store the received first test pattern in the memory, a processor for comparing the second test pattern with the received first test pattern to produce a compared result as test data, a transmitter for sending out the test data to the radio base station through an up link.

The transmitter sends out the second test pattern to the radio base station through the up link for testing the up link.

The receiver receives a condition indication instruction from the radio base station when the radio channel condition is defined from the test data and/or comparison of the second test pattern transmitted with the first test pattern. The radio channel test terminal further comprises announcing device responsive to the condition indication instruction for announcing comments indicating the radio channel condition and/or a display responsive to the condition indication instruction for displaying an image indicating the radio channel condition.

DESCRIPTION OF PREFERRED EMBODIMENTS

Prior to description of embodiments of this invention, a known test system using a remote testing apparatus will be described with reference to FIG. 1 so as to facilitate better understanding of this invention.

Figure 1:
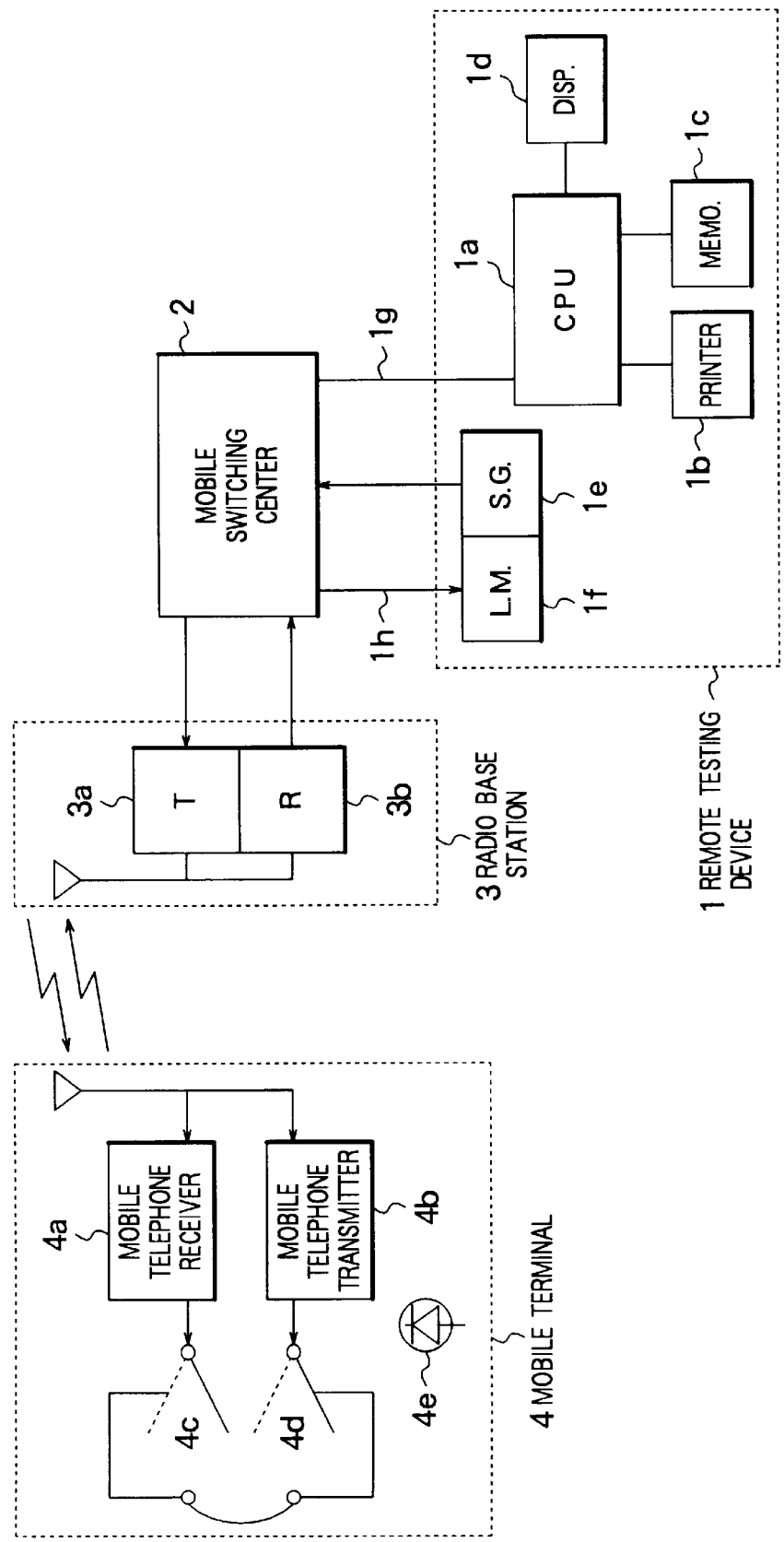
FIG. 1 is a block diagram showing a known mobile telecommunication system using a remote testing apparatus.

Referring to FIG. 1, the remote testing apparatus 1 is connected to a mobile switching center 2. The remote testing apparatus 1 comprises a central processing unit (CPU) 1a, a printer 1b, a memory (MEMO) 1c, a display terminal (DISP) 1d, a signal generator (S.G.) 1e and a level meter (L.M.) 1f. The remote testing apparatus 1 and the mobile switching center 2 are connected via a data line 1g used for transmission of data such as a test call and a 4-wire type test line 1b. The mobile switching center 2 is connected to a radio base station 3 which comprises a base station transmitter (T) 3a and a base station receiver (R) 3b. Each of the mobile terminals 4 comprises a mobile telephone receiver 4a and mobile telephone transmitter 4b. Two loop back switches 4c and 4d are provided between a voice output of the mobile telephone receiver 4a and a voice input of the mobile telephone transmitter 4b. When the loop back switches 4c an 4d are driven to connect the voice output with the voice output, a down link and an up link are connected to each other through the mobile telephone receiver 4a, the mobile telephone transmitter 4b, and the loop back switches 4c and 4d to form a test loop.

In operation, the remote testing apparatus 1 sends to a mobile switching center 2 a test call by designating a particular one of the mobile terminals 4 to establish a down link and an up link between the remote testing apparatus 1 and the particular mobile terminal 4 through the mobile switching center 2, the base station 3 and the radio channels. When the particular mobile terminal 4 receives the test call and when it is not busy, the particular mobile terminal 4 drives the loop back switches 4c and 4d to form the test loop without generating a ringing tone. Then, a remote testing display lamp 4e is lighted.

In the condition, the remote testing apparatus 1 sends out a test signal from the signal generator 1e through the down link to the particular mobile terminal. The test signal comes back to the level meter 1f through the test loop. Thus, the entire characteristic of the down link and the up link can be measured. The test results are stored in the memory 1c, and is defined at the central processing unit 1a. When the entire characteristic is defined abnormal from the measured results, the central processing unit 1a drives the printer 1b and the display 1d to indicate the abnormal.

The known testing system using the remote testing apparatus has problems as described in the preamble.

Figure 2:
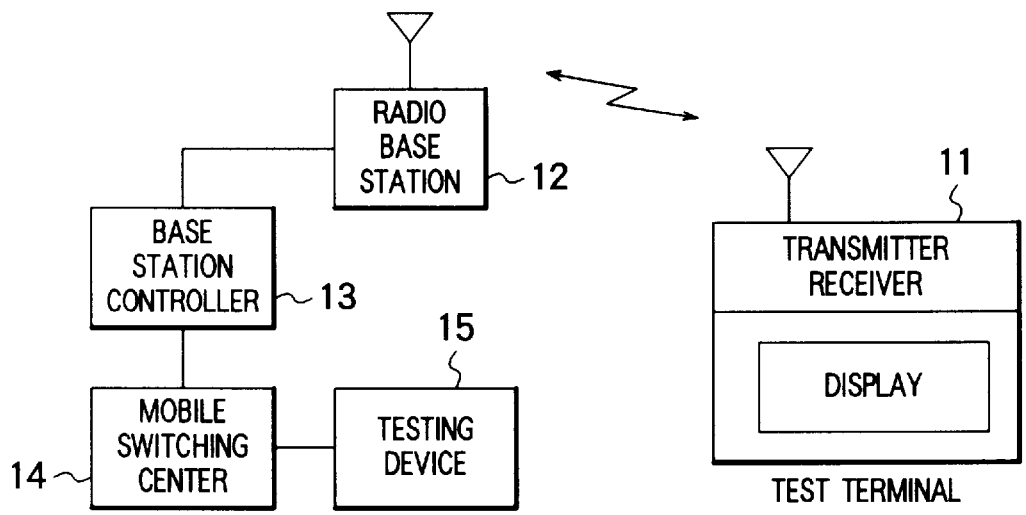
FIG. 2 is a block diagram showing a radio channel test system in the mobile telecommunication system according to one embodiment of this invention.

Now, referring to FIG. 2, a radio channel testing system in a mobile telecommunication system according to an embodiment of this invention shown therein comprises a testing device 15 and a plurality of test terminals 11 (one of which is shown in the figure). The mobile telecommunication system comprises a plurality of base stations (one of which is shown at 12 in the figure) having radio service zones, a base station controller 13 connected to the radio base stations 12 for controlling the base stations 12, and a mobile switching center 14 connected to the base station controller 13 for switching calls to or from the mobile terminals. The base station controller 13 is usually used but is omitted in FIG. 1.

Each of the test terminals 11 is disposed within each of the radio service zones of the radio base stations 12 and comprises a transmitter/receiver section and a display. The test terminal 11 has a function for communicating with the mobile switching center 14 through the radio base station 12 and base station controller 13 in the similar manner to the known mobile terminals in the mobile telecommunication system.

In testing, the testing device 15 calls the test terminal 11 through the mobile switching center 14, the base station controller 13 and the base station 12, so that a down link and an up link including the radio channels are established between the testing device 15 and the test terminal 11 through the radio base station 12, and the base station controller 13. Thus, communication for testing is performed therebetween.

The testing device 15 has a first test pattern and transmits a test signal including a control signal and the first test pattern to the test terminal 11 after start of the testing operation. Then, the testing device 15 collects test data from the test terminal 11 to define conditions of the down link and/or the up link. When defining the condition of the down link and/or the up link from the collected test data, the testing device 15 transmits an instruction for indicating announcement and display together with announcing comments and a display image corresponding to the condition defined.

Figure 3:
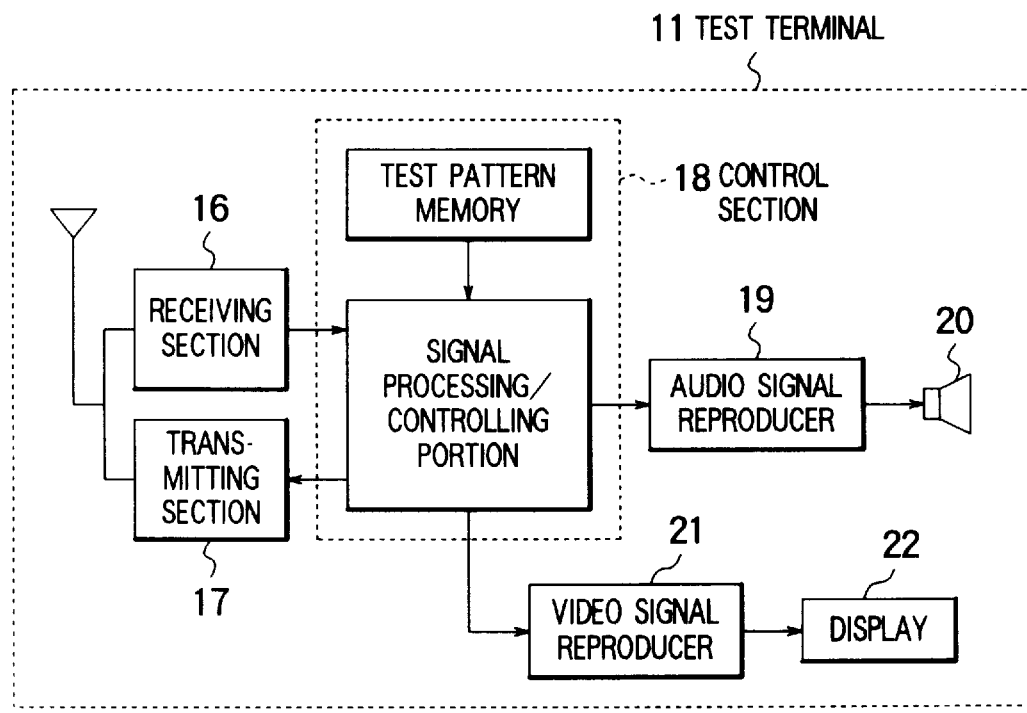
FIG. 3 is a block diagram showing a first embodiment of a test terminal used in the system in FIG. 2.

Referring to FIG. 3, the test terminal 11 comprises a receiving section 16 and a transmitting section 17 for performing radio communication with the radio base station 12. A control section 18 is connected to the receiving section 16 and the transmitting section 17 and has a test pattern memory for storing a second test pattern equal to the first test pattern and a signal processing/controlling portion to which an audio signal reproducer 19 and a video signal reproducer 21 are connected. A speaker 20 and a display 22 are connected to the audio signal reproducers 19 and the video signal reproducer 21, respectively.

Figure 4:
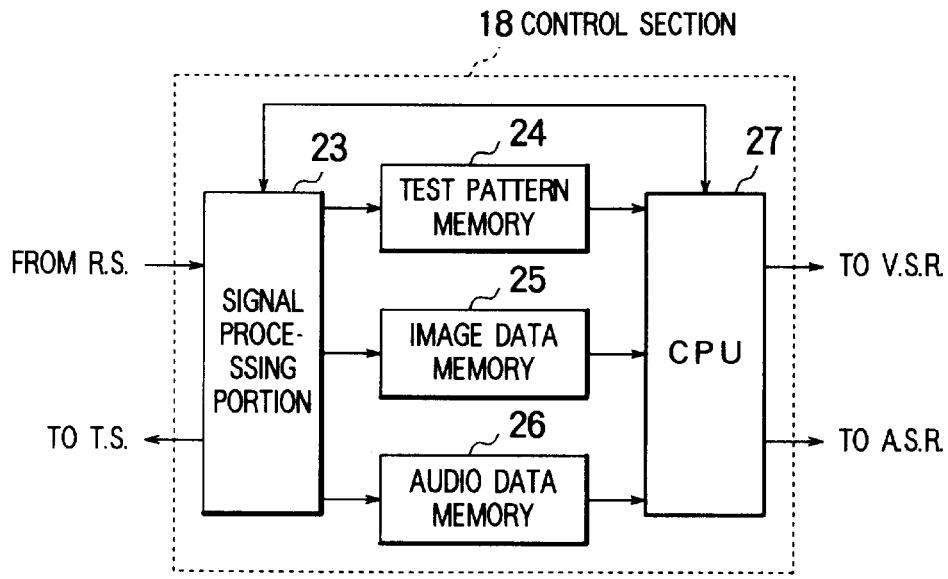
FIG. 4 is a detailed block diagram showing a control section in the test terminal of FIG. 3.

Referring to FIG. 4, the control section 18 comprises a signal processing portion 23 connected to the receiving section (R.S.) 16 and the transmitting section (T.S.) 17, the test pattern memory 24, an image data memory 25, an audio data memory 26, and a central processing unit (CPU) 27 which is connected to the audio signal reproducer (A.S.R.) 19 and the video signal reproducer (V.S.R.) 21.

The receiving section 16 receives a down link signal or a radio signal from the radio base station 12 to reproduce a received signal. The signal processing portion 23 separates the received signal into the control signal, image data, and audio data which are supplied to the CPU 27, the image data memory 25, and the audio data memory 26, respectively. The image data memory 25 and the audio data memory 26 store the image data and the audio data, respectively, supplied from the signal processing portion 23. The CPU 27 receives the control signal and executes control operation according to the control signal.

Next, operation of the test terminal 11 will be described in response to the test signal transmitted from the testing device 15 after establishing the down link and the up link between the testing device 15 and the test terminal 11 as described above.

When the receiving section 16 receives the test signal as the received signal, the signal processing portion 23 extracts the control signal which is here a test start signal indicating an test start instruction from the received signal and transmits the test start signal to the CPU 27. The CPU 27 prepares a condition for test start. After completion of the test start condition, CPU 27 sends out a response signal representing the completion of the test start condition to the transmitter section 17 through the signal processing portion 23. The response signal is transmitted, as an up link control signal, to the radio base station 12 from the transmitting section 17 through the radio channel, and is then fed to the testing device 15 from the radio base station 12 through the base station control apparatus 13 and mobile telephone exchange 14. Upon receiving the up link control signal representing the completion of the test start condition, the testing device 15 transmits the first test pattern as the test signal through the down link.

When the test terminal 11 receives, as the received signal, the test signal through the radio base station 12, the signal processing portion 23 extracts the first test pattern as received pattern from the received signal and stores the received pattern into the image data memory 25.

While, the signal processing portion 23 simultaneously reads out the second test pattern from the test pattern memory 24 and then supplies the second test pattern to the transmitting section 17. Then, the second test pattern is transmitted, as the up link signal, to the radio base station 12 from the transmitting section 17, and then supplied to the testing device 15 from the radio base station 12 through the base station controller 13 and the mobile switching center 14. Upon receiving the up link signal, the testing device 15 extracts and holds the second test pattern as a reception pattern.

In the test terminal 11, the CPU 27 compares the second test pattern in the test pattern memory 24 with the received pattern in the image data memory 25 after the received pattern is written into the image data memory 25. From the comparison, there is calculated a error rate. In detail, bits of the image data of the second test pattern are compared with bits of the image data of the received pattern to obtain a number of error bits therebetween. Then, a rate of the error bit number to the total bit number of the image data of the second test pattern is calculated as the error rate. The error rate represents, as a down-link test data, the condition of the down link including the radio channel.

Upon completion of calculation of the error rate of the down link, the CPU 27 sends the calculated error rate as the down-link test data to the transmitting section 17 through the signal processing portion 23. The down-link test data are transmitted, as the up link signal, to the testing device 15 from the transmitting section 17 through the radio base station 12, the base station controller 13 and the mobile switching center 14. In the testing device 15, the down-link test data are notified to an operator of the testing device by, for example, a display and/or a printer.

On the other hand, the testing device 15 compares the reception pattern with the first test pattern to produce another error rate between the reception pattern and the first test pattern in the similar manner as in the CPU 27. The error rate represents, as up-link test data, the condition of the up link. The up-link test data are also notified to the operator.

The operator defines from the down-link test data and the up-link test data the conditions of the up link and/or the down link. Then, the operator selects image data and audio data corresponding to the defined condition of the up link and/or the down link so as to notify the condition to the user of the mobile terminals in the radio service zone of the radio base station 12.

The testing device 15 transmits a condition indication instruction together with the image data and audio data selected as the down link signal to the test terminal 11.

When the test terminal 11 receives the down link signal at the receiving section 16, the image data and the audio data are stored in the image data memory 25 and the audio data memory 26 through the signal processing portion 23, respectively. Then, the CPU 27 is responsive to the condition indication instruction and reads out the the image data and the audio data from the image data memory 25 and the audio data memory 26 to the video signal reproducer 21 and the audio signal reproducer 19, respectively. The image signal reproducer 21 drives the display 22 to display the image and the audio signal reproducer 19 drives the loud speaker 20 to announce the audio data as comments. Thus, users of mobile terminals can know the conditions of the up and/or down link in the radio service zone by looking the image displayed and/or hearing the comments announced.

Figure 5:
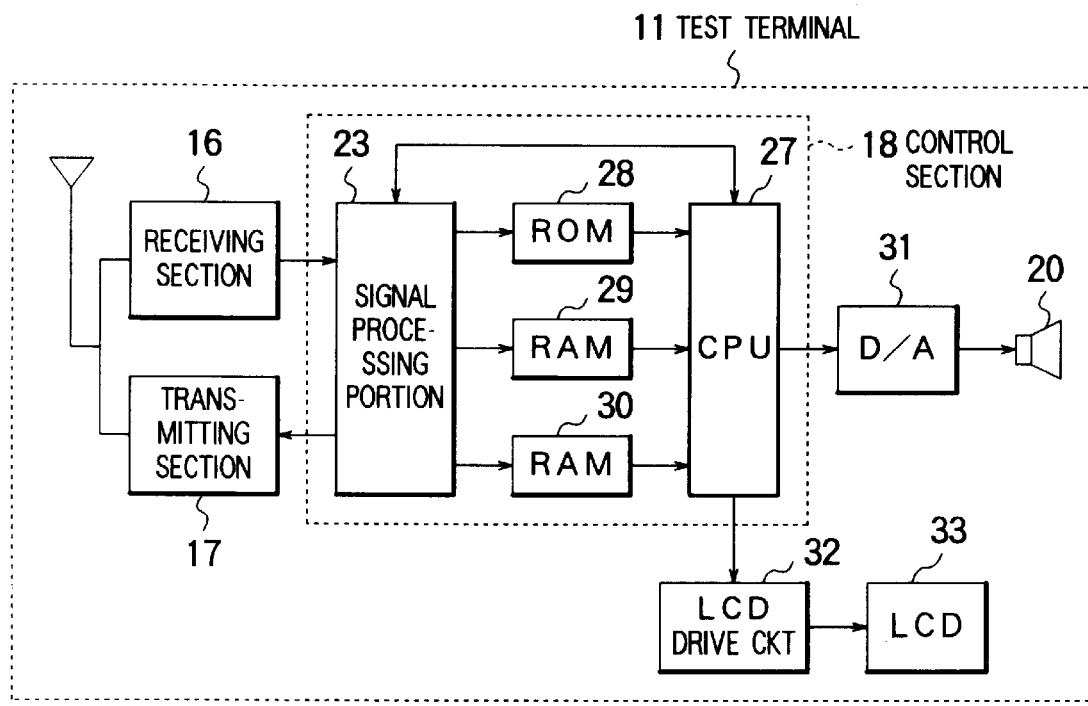
FIG. 5 is a block diagram showing a practical example of the test terminal of FIG. 3.

FIG. 5 is a block diagram showing a practical example of the test terminal 11 shown in FIGS. 2–4. In the shown example, a read only memory (ROM) 28, two random access memories (RAMs) 29 and 30 are used as the test pattern memory 24, the image data memory 25 and the audio data memory 26, respectively. An LCD (liquid crystal display) 33 is used as the display 22. When the LCD 33 has 600 pixels in the horizontal direction and 400 pixels in the vertical direction, an LCD drive circuit 32 is used for the image signal reproducer 21 and forms a matrix data of 600×400 pixels from the image data read out by the CPU 27. Providing that one picture is displayed at one time, the ROM 28 and RAM 29 may be ones of 256 Kbit memory capacity.

A digital to analog (D/A) converter 31 can be used as the audio signal reproducer 19 for converting the digital audio data from the CPU 27 to an analog radio signal.

In the example, since the image data have 240,000 (=600×400) pixels or bits, the error rate is calculated as 24/240,000 (=$10^{-4}$) when 24 bit errors are measured by comparing the second test pattern with the received pattern.

The image and comments displayed at the LCD 33 and announced by the speaker 20 can be an image including characters of a sentence read as "The communication quality in this area is now good" or "The communication quality in this area is now not good" and announcement comments including the same sentence, respectively.

When the radio channels suffers from any obstacle to disable communication between the radio base station 12 and the test terminal 11, the test operation cannot be completed. Then, the test operation is retried. When the test operation is not completed over a predetermined times, for example, three times, the CPU 27 reads out the second test pattern from the ROM 28 as the test pattern memory to display the second test pattern on the LCD 33 so as to notify the obstacle of the radio channel in the radio service zone to the users of the mobile terminals. To this end, the test pattern should include the characters of a sentence "Obstacle is currently caused in the area".

Next, referring to FIG. 6, description will be made as regards another control section of the test terminal according to the second embodiment of this invention.

Figure 6:
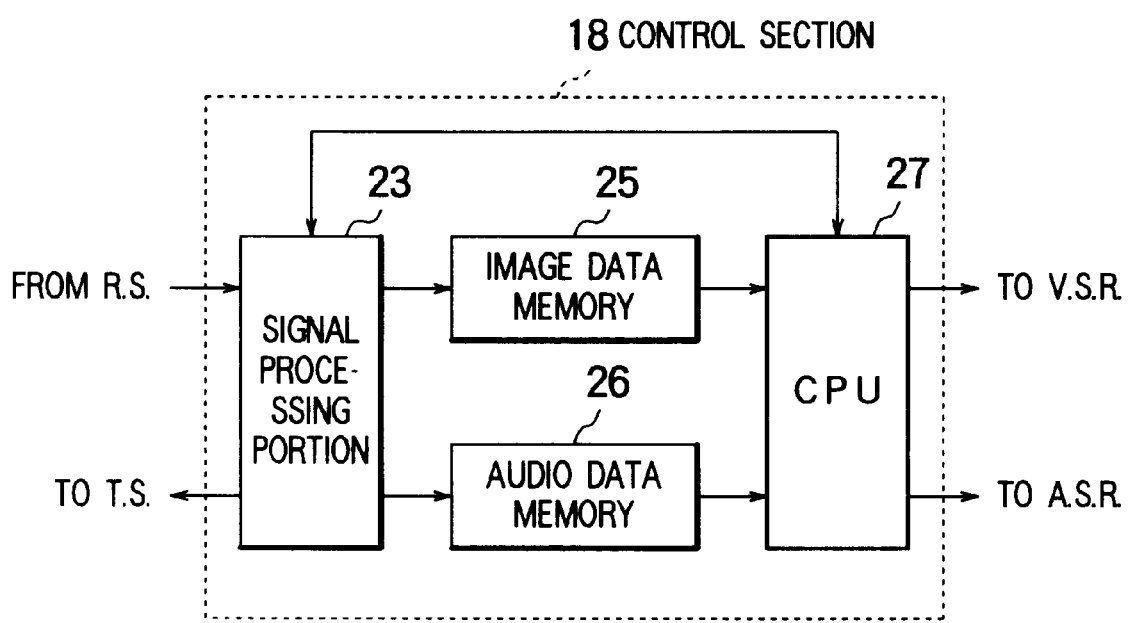
FIG. 6 is a block diagram showing another control section according to a modification.

The control section 18 of the test terminal 11 shown in FIG. 6 is similar to the control section shown in FIGS. 4 and 5 except that a RAM having a larger memory capacity is used for the the image data memory 25 without use of the test pattern memory 24 of a ROM 28.

In an aspect of this embodiment, the image data memory 25 has a memory area for storing the second test pattern and another memory area for storing the received pattern. Thus, the CPU 27 accesses the image data memory 25 to carry out the comparison of the both patterns.

The image data memory 25 has a large memory capacity able to store a plurality of images. In order to store two (2) images each having, for example, 240,000 (=600×400) pixels, the image data memory 25 is required to have a 480 Kbit memory capacity.

In another aspect of this embodiment, the second test pattern is not previously held in the test terminal 11 but the testing device 15 transmits the first test pattern repeatedly, for example, five times at a start of the test. The subsequent transmission of the first test pattern produces five received patterns at the test terminal 11. The five received patterns are stored at different five memory areas in the image data memory 25. Then, the CPU 27 compares one of the five received patterns with the next subsequent one to obtain the number of bit errors therebetween. The comparison is performed for different four pairs of the five received patterns. As a result, four bit error numbers are obtained which are averaged to have a mean value. The error rate is calculated from the mean value and the pixel number of the first test pattern.

The operation after calculation of the error rate is carried out in the similar manner as in the embodiment of FIGS. 2–5.

In this aspect, the prior one of the received patterns is considered as the second test pattern in the previous embodiment which is compared with the subsequent one of the received patterns.

In order to store five (5) images each having, for example, 240,000 (=600×400) pixels, the image data memory 25 is required to have a 1,200 Kbit memory capacity.

In the aspect, it is necessary to previously store the second test pattern in the test terminal. Therefore, it is possible to change the test pattern each time for performing the test.

Accordingly, since any image data may be used as the test pattern used for the radio channel test, there is no restriction in the number of test patterns used.

According to this invention, the condition of the down link can be evaluated at the test terminal while the condition of the up link can be evaluated at the testing device independently from the down link condition.

Moreover, according to this invention, the test results are displayed and announced at the test terminal disposed in the radio service zone, users of the mobile terminals can readily know the condition or quality of the communication in the radio service zone.

In addition, according to the present invention, an image data having information to be notified to the users of the mobile terminals can be used as the test pattern which is stored in the test terminal. In the case, the test pattern can be used as an image to be displayed for notification.

The present invention has been described in connection with preferred embodiments, but should not be considered to be restricted thereto. It could be understood from the above description by those skilled in the art that there are various variations, modifications and other designations within the scope of this invention.

What is claimed is:

1. A radio channel test system in a mobile telecommunication system comprising a mobile switching station, a plurality of radio base stations coupled to said mobile switching station and having radio service zones, respectively, and a plurality of mobile terminals freely moving in the radio service zones, a particular one of said mobile terminals currently being in a particular one of said radio service zones and communicating with a particular one of said radio base stations having said particular radio service zone through radio channels in said particular radio service zone to thereby perform communication with said mobile switching station through an up link and a down link including said radio channels, said radio channel test system comprising:

a testing device connected to said mobile switching center and having a first test pattern; and a plurality of test terminals disposed within said radio service zones, respectively, and having a second test pattern equal to said first test pattern;

said testing device calling a particular one of said plurality of test terminals to send out said first test pattern to said particular test terminal through said down link and to obtain test data from said particular test terminal through said up link;

said particular test terminal receiving said first test pattern as a received pattern and comparing said received pattern with said second test pattern to produce a compared result, said particular test terminal sending out said compared result as said test data to said testing device through said up link.

2. A radio channel test system in a mobile telecommunication system as claimed in claim 1, each of said test terminals having indicating means for indicating radio channel condition, wherein said testing device sends out a condition indication instruction to said particular test terminal when defining the radio channel condition from said test data, and said particular test terminal is responsive to said condition indication instruction to drive said indicating means to indicate the radio channel condition.

3. A radio channel test system in a mobile telecommunication system as claimed in claim 2, wherein said indicating means comprises announcing means for announcing comments indicting the radio channel condition.

4. A radio channel test system as claimed in claim 3, wherein said testing device transmits, together with said condition indicating instruction, audio data of said comments to be announced.

5. A radio channel test system in a mobile telecommunication system as claimed in claim 2, wherein said indicating means comprises display means for displaying an image indicating the radio channel condition.

6. A radio channel test system as claimed in claim 5, wherein said testing device transmits, together with said condition indicating instruction, image data of said image to be displayed.

7. A radio channel test system as claimed in claim 5, wherein said test terminal defines obstacle of the radio channels when the radio channel test is interrupted over a predetermined number of times, and displays said second test pattern by said display means.

8. A radio channel test system as claimed in claim 7, wherein said second test pattern having an image portion representing information of radio channel obstacle.

9. A radio channel test system in a mobile telecommunication system as claimed in claim 2, wherein said particular test terminal sends out said second test pattern to said testing device through said up link, said testing device receiving said second test pattern as a reception pattern and comparing said reception pattern with said first test pattern to produce an error therebetween, said testing device sending out said condition indication instruction to said particular test terminal when defining a radio channel obstacle of said up link from said error.

10. A radio channel test system in a mobile telecommunication system as claimed in claim 1, wherein said testing device sends out said first test pattern repeatedly to produce a plurality of subsequent received patterns at said test terminal, a prior one of said subsequent received patterns is used as said second test pattern and is compared with the next subsequent one of said subsequent received patterns to obtain the compared results.

11. A radio channel test terminal for use in testing radio channels in a radio service zone of a radio base station in a mobile telecommunication system, said radio base station sending out a first test pattern to said radio channel test terminal through a down link, said radio channel test terminal being disposed in said radio service zone and comprising:

memory means for storing test patterns including a second test pattern equal to said first test pattern;

receiving means for receiving said first test pattern as a received first test pattern to store said received first test pattern in said memory means;

processing means for comparing said second test pattern with said received first test pattern to produce a compared result as test data;

transmitting means for sending out said test data to said radio base station through an up link.

12. A radio channel test terminal as claimed in claim 11, wherein said transmitting means sending out said second test pattern to said radio base station through said up link for testing said up link.

13. A radio channel test terminal as claimed in claim 12, said receiving means receiving a condition indication instruction from said radio base station when the radio channel condition is defined from said test data and/or comparison of said second test pattern transmitted with said first test pattern, said radio channel test terminal further comprising announcing means responsive to said condition indication instruction for announcing comments indicating the radio channel condition.

14. A radio channel test terminal as claimed in claim 13, further comprising display means responsive to said condition indication instruction for displaying an image indicating the radio channel condition.

15. A radio channel test terminal as claimed in claim 14, wherein said processing means defines obstacle of the radio channels when the radio channel test is interrupted over a predetermined number of times, and displays said second test pattern by said display means.

16. A radio channel test terminal as claimed in claim 15, said second test pattern having an image portion representing information of radio channel obstacle.

17. A radio channel test terminal as claimed in claim 11, said first test pattern being sent out from said radio base station repeatedly, the received first test pattern of said first test pattern repeated is sequentially stored in said memory means as said test patterns, said processing means comparing, as said second test pattern, prior one of said test patterns with the subsequent one of said test patterns.

* * * * *